United States Patent
Nagai et al.

(10) Patent No.: US 6,862,374 B1
(45) Date of Patent: Mar. 1, 2005

(54) IMAGE PROCESSING DEVICE, IMAGE PROCESSING METHOD, AND RECORDING MEDIUM STORING THE IMAGE PROCESSING METHOD

(75) Inventors: Yoshinori Nagai, Nara (JP); Hajime Takezawa, Nara (JP); Kazuhiro Saiki, Nara (JP); Toshiya Takahashi, Kyoto (JP); Kyouichi Suzuki, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 719 days.

(21) Appl. No.: 09/680,904

(22) Filed: Oct. 6, 2000

(30) Foreign Application Priority Data

Oct. 6, 1999 (JP) ............................................ 11-285975

(51) Int. Cl.⁷ .................................................. G06K 9/36
(52) U.S. Cl. ...................... 382/285; 382/154; 345/419; 345/427; 348/578; 348/579
(58) Field of Search ................................. 382/157, 107, 382/285, 154; 345/646, 647, 648, 473, 474, 475, 955, 952, 419, 420, 422–427; 348/578, 579, 580

(56) References Cited

U.S. PATENT DOCUMENTS

| | | | |
|---|---|---|---|
| 5,867,171 A | * | 2/1999 | Murata et al. ............... 345/475 |
| 5,990,901 A | * | 11/1999 | Lawton et al. ............... 345/581 |
| 6,188,776 B1 | * | 2/2001 | Covell et al. ................ 382/100 |
| 6,563,503 B1 | * | 5/2003 | Comair et al. .............. 345/473 |

OTHER PUBLICATIONS

"Facial Image Processing Environment", Y. Yagi, et al. (Mar. 19, 1998).

* cited by examiner

*Primary Examiner*—Bhavesh M. Mehta
*Assistant Examiner*—Ali Bayat
(74) *Attorney, Agent, or Firm*—David G. Conlin; William J. Daley, Jr.; Edwards & Angell, LLP

(57) ABSTRACT

An image processing device for generating a 3-D model image of a target object included in an input image, comprises a face image input means for inputting a face image; a 3-D model input means for inputting one or a plurality of 3-D models for each of a plurality of parts; a 3-D model selection means for selecting a 3-D model for an arbitrary part of the plurality of parts based on an instruction input by an operator; a face image mapping means for mapping the face image input via the face image input means to the 3-D model selected by the 3-D model selection means and for displaying the mapped 3-D model; and an image generation means for generating a 3-D still image using the 3-D model selected by the 3-D model selection means and the face image input by the face image input means.

16 Claims, 15 Drawing Sheets

FIG.13
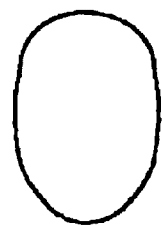 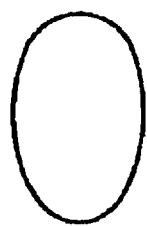 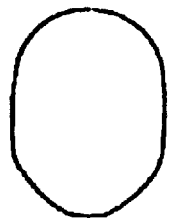 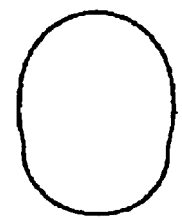
Standard type    Thin type    Broad type    Circle-shaped type x=x_df x=x_df

IMAGE PROCESSING DEVICE, IMAGE PROCESSING METHOD, AND RECORDING MEDIUM STORING THE IMAGE PROCESSING METHOD

BACKGROUND OF THE INVENTION

1. Field of the Invention

The present invention relates to an image processing device and image processing method for generating a realistic still or moving image by utilizing an input image, and a recording medium storing the image processing method.

2. Description of the Related Art

Conventionally, when images are generated using three-dimensional (3-D) models, image data is typically created by a skilled person using a CAD tool or the like. For example, as disclosed in Japanese Patent No. 2943703, there is a known technique in which 3-D model parts are prepared and are grouped into categories and in which these parts are combined. Such a technique does not takes into account that 3-D models are generated from two-dimensional (2-D) images such as photographs or animations.

There is another known technique in which a 3-D model of a face is generated by receiving an image of a face and mapping between the face image and 3-D models, as described in Publication 1 (Yagi et al., "Facial Image Processing Environment", Information Processing Society Research Report, Vol. 98, No. 26, pp. 65–72 (1998)).

However, in the technique in which a skilled person creates data using a CAD tool or the like, or in the technique in which categorized 3-D model parts are prepared and combined, it is not taken into account that two-dimensional (2-D) images such as photographs or animations are used. For this reason, it is difficult to generate highly realistic images.

In the technique in which a 3-D model of a face is generated by receiving an image of a face and mapping between the face image and 3-D models, a body apart from a head, such as a trunk, is not taken into account. Otherwise, after a 3-D model of a face or head alone is generated, a 2-D still or moving image is created from the generated face or head and is inserted into a 2-D still or moving image of the trunk. Therefore, a 3-D model of the trunk is not taken into account.

SUMMARY OF THE INVENTION

According to an aspect of the present invention, an image processing device for generating a 3-D model image of a target object included in an input image, comprises a face image input means for inputting a face image; a 3-D model input means for inputting one or a plurality of 3-D models for each of a plurality of parts; a 3-D model selection means for selecting a 3-D model for an arbitrary part of the plurality of parts based on an instruction input by an operator; a face image mapping means for mapping the face image input via the face image input means to the 3-D model selected by the 3-D model selection means and for displaying the mapped 3-D model; and an image generation means for generating a 3-D still image using the 3-D model selected by the 3-D model selection means and the face image input by the face image input means.

In one embodiment of this invention, the 3-D model has information on a motion on a time series of one or all of the plurality of parts; and the image generation means generates a 3-D moving image using the 3-D model selected by the 3-D model selection means and the face image input by the face image input means.

According to another aspect of the present invention, an image processing method for generating a 3-D model image of a target object included in an input image, comprises the steps of inputting a face image via a face image input means: inputting one or a plurality of 3-D models for each of a plurality of parts via a 3-D model input means; selecting a 3-D model for an arbitrary part of the plurality of parts based on an instruction input by an operator; mapping the face image input to the selected 3-D model and displaying the mapped 3-D model on a display means; and generating a 3-D still or moving image using the selected 3-D model and the input face image.

According to another aspect of the present invention, a computer-readable recording medium stores an image processing program for generating a 3-D model image of a target object included in an input image, the program comprising the steps of inputting a face image via a face image input means; inputting one or a plurality of 3-D models for each of a plurality of parts via a 3-D model input means; selecting a 3-D model for an arbitrary part of the plurality of parts based on an instruction input by an operator: mapping the face image input to the selected 3-D model and displaying the mapped 3-D model on a display means: and generating a 3-D still or moving image using the selected 3-D model and the input face image.

According to the image processing device, the image processing method, and the recording medium having such characteristics, a face image is input via the face image input means. One or a plurality of 3-D models are input for each of a plurality of 3-D parts via the 3-D model input means. A 3-D model to be used is selected for an arbitrary one of the input plurality of parts, based on an instruction input by an operator. A 3-D still image is generated by mapping the input face image onto the selected 3-D model. Thus, a face image is input and mapped to a 3-D model, so that a higher quality 3-D still image can be generated from the input 2-D image. Further, when a 3-D model has information on a motion thereof on a time series, a higher quality 3-D model can be generated using the motion information. For example, when a 3-D model of a part corresponding to a face has information on a motion thereof on a time series, facial expression can be changed using the motion information.

In the image processing device according to one embodiment of the present invention, the plurality of parts include a part corresponding to a trunk, a part corresponding to a face, and a part corresponding to a head.

According to the image processing device of the present invention having such characteristics, a 3-D model of a trunk is provided. The operator can select the 3-D model of the trunk via the input means. In addition of a face and a head, a 3-D model of a whole body including a trunk can be customized in accordance with the operator's preference.

In the image processing device according to one embodiment of the present invention, when the 3-D model selection means changes a 3-D model of a first part, the 3-D model selection means changes a 3-D model of a second part in association with the changing of the 3-D model of the first part.

According to the image processing device of the present invention having such characteristics, not only a 3-D model of a part being selected but a 3-D model of another part are changed, thereby reducing the operator's selection task.

In the image processing device according to one embodiment of the present invention, when a first 3-D model of a first part and a second 3-D model of a second part corresponding to the first part are selected, the 3-D model selection means stores a combination of the first and second parts and the first and second 3-D models; and when an arbitrary 3-D model of the first part is changed to the first 3-D model, the 3-D model selection means changes a 3-D model of the second part to the second 3-D model.

According to the image processing device of the present invention having such characteristics, when a 3-D model of a part and a 3-D model of an another part corresponding thereto are selected, the combination of the parts and the 3-D models is stored. At a successive time or thereafter, when the 3-D model of the part, the combination of which is stored is selected, the 3-D model of the other part corresponding thereto is automatically selected. Thereby, the operator's selection task can be reduced.

In the image processing device according to one embodiment of the present invention, when a specific type first 3-D model of a first part is selected, a second 3-D model of a second part corresponding to a third 3-D model of the first part prior to the selection is stored by the 3-D model selection means; and when the specific type first 3-D model of the first part is changed to a 3-D model not being of the specific type of the first part, the 3-D model selection means changes a 3-D model of the second part to the stored second 3-D model.

According to the image processing device of the present invention having such characteristics, for example, a trunk wearing a suit is selected for a part corresponding to a trunk, and a head wearing a 7-to-3 partition (defined below) is selected for a part corresponding to a head to be coupled to the trunk. Thereafter, for example, when a trunk wearing a baseball uniform which is of a specific type is selected, a 3-D model of the head part is changed to a head wearing baseball cap. In this case, the combination prior to the selection of the specific type (i.e., the combination of the trunk wearing a suit and the head wearing the 7-to-3 partition) is stored. Thereafter, when a trunk wearing a suit (or casual wear not included in the specific type) is selected for the trunk part, the 3-D model of the head part is changed back to the 7-to-3 partition. Thus, for example, when a specific type of 3-D model of a trunk part is changed to a 3-D model (not the specific type), a 3-D model of a head part is changed from a baseball cap to the 7-to-3 partition. Therefore, the operator's tasks can be reduced.

In the image processing device according to one embodiment of the present invention, further comprises a face image categorization means for categorizing a face image input via the face image input means: and a face model selection means for automatically selecting a 3-D model of a part corresponding to a face based on a result of the categorization by the face image categorization means. The face image mapping means maps the face image input via the face image input means to the 3-D model of the part corresponding to a face selected via the face model selection means.

In the image processing device according to one embodiment of the present invention, further comprises a face image categorization means for categorizing a face image input via the face image input means; and a head model selection means for automatically selecting a 3-D model of a part corresponding to a head based on a result of the categorization by the face image categorization means. The face image mapping means maps the face image input via the face image input means to the 3-D model of the part corresponding to a head selected via the head model selection means.

According to another aspect of the present invention, an image processing method for generating a 3-D model image of a target object included in an input image, comprises the steps of inputting a face image via a face image input means; categorizing the input face image; inputting one or a plurality of 3-D models for each of a plurality of parts via a 3-D model input means; automatically selecting a 3-D model of an input arbitrary part based on a result of the categorization by the face image categorization step; mapping the face image input to the automatically selected 3-D model and displaying the mapped 3-D model on a display means; and generating a 3-D still or moving image using the automatically selected 3-D model and the input face image.

According to another aspect of the present invention, a computer-readable recording medium stores an image processing program for generating a 3-D model image of a target object included in an input image, the program comprising the steps of inputting a face image via a face image input means; categorizing the input face image; inputting one or a plurality of 3-D models for each of a plurality of parts via a 3-D model input means; automatically selecting a 3-D model of an input arbitrary part based on a result of the categorization by the face image categorization step: mapping the face image input to the automatically selected 3-D model and displaying the mapped 3-D model on a display means: and generating a 3-D still or moving image using the automatically selected 3-D model and the input face image.

According to the image processing device, image processing method, and recording medium of the present invention having such characteristics, 3-D models of parts corresponding to a face and a head are automatically selected, thereby making it possible to reduce the operator's selection task.

Thus, the invention described herein makes possible the advantages of providing an image processing device and image processing method for generating a realistic still or moving image by utilizing an input image, and a recording medium storing the image processing method.

These and other advantages of the present invention will become apparent to those skilled in the art upon reading and understanding the following detailed description with reference to the accompanying figures.

BRIEF DESCRIPTION OF THE DRAWINGS

FIG. 13 is a diagram for explaining categorization of a 3-D model of a face stored in a memory.

DESCRIPTION OF THE PREFERRED EMBODIMENTS

Hereinafter, the present invention will be described by way of illustrative examples with reference to the accompanying drawings.

EXAMPLE 1

Figure 1:
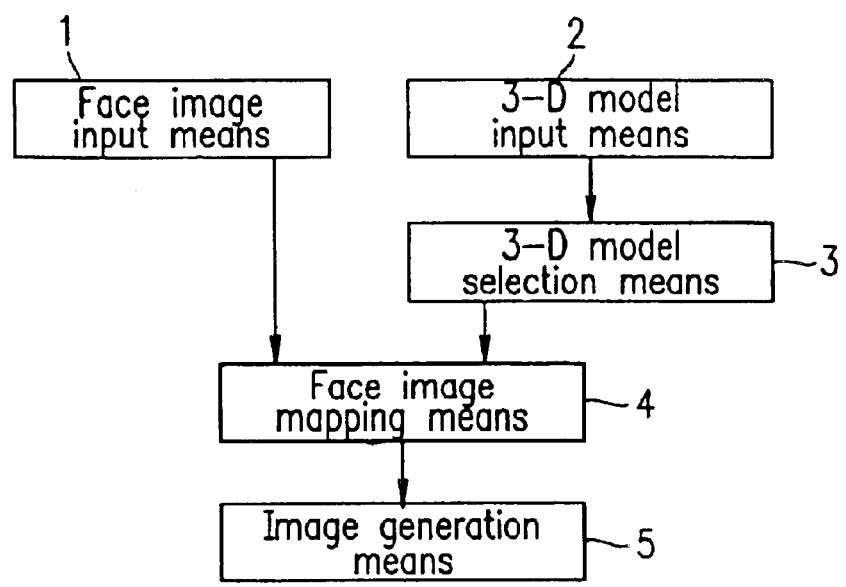
FIG. 1 is a system structure diagram showing an image processing device according to Example 1 of the present invention.

FIG. 1 is a system structure diagram showing an image processing device according to Example 1 of the present invention. The image processing device of Example 1 includes a face image input means 1, a 3-D model input means 2, a 3-D model selection means 3, a face image mapping means 4, and an image generation means 5.

The face image input means 1 inputs a face image. As to how a face image is input, for example, the face image is read from a file stored in a disk device; the face image is input via a digital camera: or the face image is captured from a video signal.

The 3-D model input means 2 inputs one or more 3-D models for each of a plurality of parts. As to how a face image is input, for example, 3-D models are stored in the form of data files in a disk device, and are read out as required. Alternatively, information on 3-D models may be stored in a program file, and when the program is started, the information may be read out along with the main body of the program.

The 3-D model selection means 3 selects a 3-D model to be used for an arbitrary one of the parts, based on an instruction input by the operator. For each part, a thumbnail image of a 3-D model thereof is displayed. The operator can select a thumbnail image, for example, by clicking on the thumbnail image using a mouse. The thumbnail images representing the 3-D models of each part only needs to be distinguished from one another. The thumbnail images are not necessarily created from 3-D models, or 2-D models obtained by projecting or converting 3-D models into two dimensions. Further, default 3-D models of some or all parts may be prepared in advance. When the operator does not perform or cancels the selection, image generation may be performed by a method described below based on a default 3-D model and an input face image.

In this case, when the thumbnail images are displayed and some thumbnail images are selected, image generation may be performed based on the 3-D models of all parts and the resulting image may be displayed. This allows the operator to easily determine whether selection of 3-D models needs to be continued. Accordingly, although the operator may select some or none of all the parts, final image generation may still be performed in such a situation.

The face image mapping means 4 maps the face image input from the face image input means 1 to the 3-D model selected by the 3-D model selection means 3.

The image generation means 5 generates a 3-D still or moving image based on the 3-D model selected by the 3-D model selection means 3 and the face image input from the face image input means 2.

There are known techniques, such as texture mapping and 3-D rendering, for the mapping of a face image to a 3-D model by a face image mapping means 4 and the generation of a still or moving image by an image generation means 5, respectively. For example, using Direct 3D operated on Windows 98 (both produced by Microsoft Corporation), a face image can be texture mapped to a 3-D model thereof, and the generated 3-D model can be oriented at an arbitrary angle. The face image mapping means 4 and the image generation means 5 are not necessarily separate modules.

Next, the image processing operation of the thus constructed image processing device will be described with reference to the flowchart shown in FIG. 2.

Initially, a 3-D model is input via the 3-D model input means 2 (step S1). Specifically, for example, 3-D models may be stored in the form of data files in a disk device, and read out as required, as described above.

Next, an image of a face is input via the image input means 1 (step S2). Specifically, for example, the face image may be read out from a file in the disk device, as described above.

Next, a 3-D model to be used for each of a plurality of parts is selected via the 3-D model selection means 3 (step S3). Specifically, for example, a 3-D model thumbnail image for each part may be displayed. The operator selects from the thumbnail images by clicking with a mouse, for example.

In Example 1, the parts include a part corresponding to a trunk, a part corresponding to a face, and a part corresponding to a head (hereinafter respectively referred to as a "trunk part", a "facepart", and a "head part").

In Example 1, if one or all of the parts have information on motions thereof on a time series, moving images of the parts are generated in step S5 described below. For example, if a face part has information on a motion thereof on a time series, a moving image in which facial expressions change is generated. In this case, a thumbnail of a moving image is displayed for the selection of 3-D models. The thumbnail display of the moving image does not necessarily need to include a 3-D model having information on a motion thereof, but may have a simple 2-D moving image.

In Example 1, the 3-D model selection means 3 may include an additional function: when the 3-D model of a selected part is changed, the 3-D models of the other parts are also correspondingly changed. For example, when a trunk part is changed to a trunk wearing a baseball uniform, a head part is changed to a head wearing a baseball cap. Thus, the operator's task in selection is reduced.

In Example 1, the 3-D model selection means 3 may include additional functions: (1) when one 3-D model of one part and one 3-D model of a corresponding part are selected, the combination of the parts and the 3-D models is stored; and (2) when an arbitrary 3-D model of the one part is changed to the one 3-D model of the one part, a 3-D model of the corresponding part is changed to the one 3-D model corresponding to the stored combination.

For example, when a trunk wearing a baseball uniform is selected for a trunk part, a 3-D model of a head part is changed to a head wearing baseball cap. Here such a combination (i.e., a combination of the trunk wearing the baseball uniform and the head wearing the baseball cap) is stored. Thereafter, when a trunk wearing a suit is selected for a trunk part in accordance with an operator's instruction, a 3-D model of a head part is changed to a 7-to-3 partition. The term "7-to-3 partition" is defined as a hairstyle in which hair is parted at a side of the head, the proportion of the hair on the right to the hair on the left being about 7:3. Here such a combination (i.e., a combination of the trunk wearing the suit and the head wearing the 7-to-3 partition) is stored. Thereafter, when the trunk wearing the baseball uniform is again selected for a trunk part in accordance with an operator's instruction, a 3-D model of a head part is automatically changed from the 7-to-3 partition to the baseball cap in accordance with the previously stored combination. Thus, the operator's task in selection is reduced.

Further, in Example 1, the 3-D model selection means 3 may include additional functions: (1) when a specific type of 3-D model of one part is selected, a 3-D model of another part corresponding to a 3-D model of the one part prior to the selection is stored: and (2) when the specific type 3-D model of the one part is changed to another 3-D model (not the specific type) of the one part, a 3-D model of the other part is changed to the previously stored 3-D model of the other part.

For example, a trunk wearing a suit is previously selected for a trunk part, and a head wearing a 7-to-3 partition is previously selected for a head part corresponding to the trunk. Thereafter, for example, when a trunk wearing a baseball uniform which is of a specific type is selected, a 3-D model of the head part is changed to a head wearing a baseball cap. In this case, the combination prior to the selection of the specific type (i.e., the combination of the trunk wearing a suit and the head wearing a 7-to-3 partition) is stored. Thereafter, when a trunk wearing a suit (or casual wear not included in the specific type) is selected for the trunk part, the 3-D model of the head part is changed back to the 7-to-3 partition. Thus, for example, when a specific type of 3-D model of a trunk part is changed to a 3-D model (not the specific type), a 3-D model of a head part is changed from a baseball cap to 7-to-3 partition. Therefore, the operator's tasks can be reduced.

Figure 2:
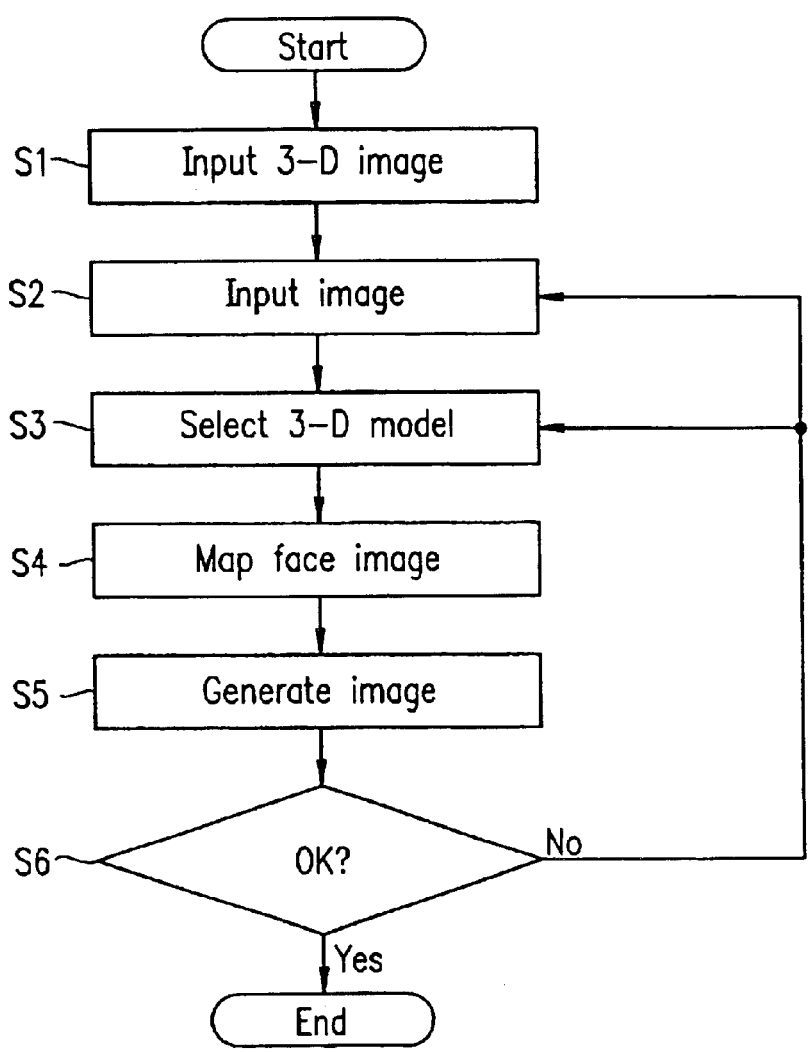
FIG. 2 is a flowchart showing an processing operation by the image processing device of the present invention.

Next, in step S4 shown in FIG. 2, the input face image is mapped to the 3-D model selected as described above by the face image mapping means 4. Next, instep S5, a still or moving image is generated by the image generation means 5.

Figure 3:
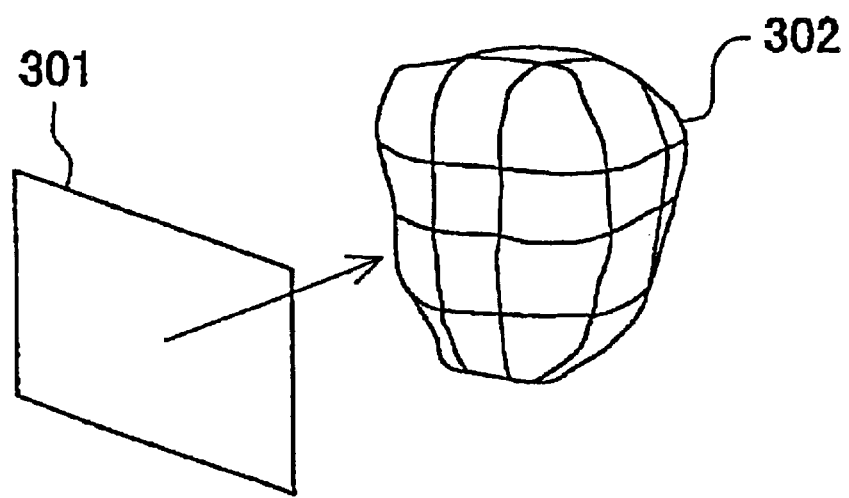
FIG. 3 is a diagram for explaining a technique for mapping a face image.

The mapping of a face image is performed as follows. As shown in FIG. 3, for example, a face image 301 is mapped to a 3-D model 302 of a face. The mapping of a face image and the generation of a still or moving image may be performed using the above-described Direct 3D operated on Windows 98.

EXAMPLE 2

Figure 4:
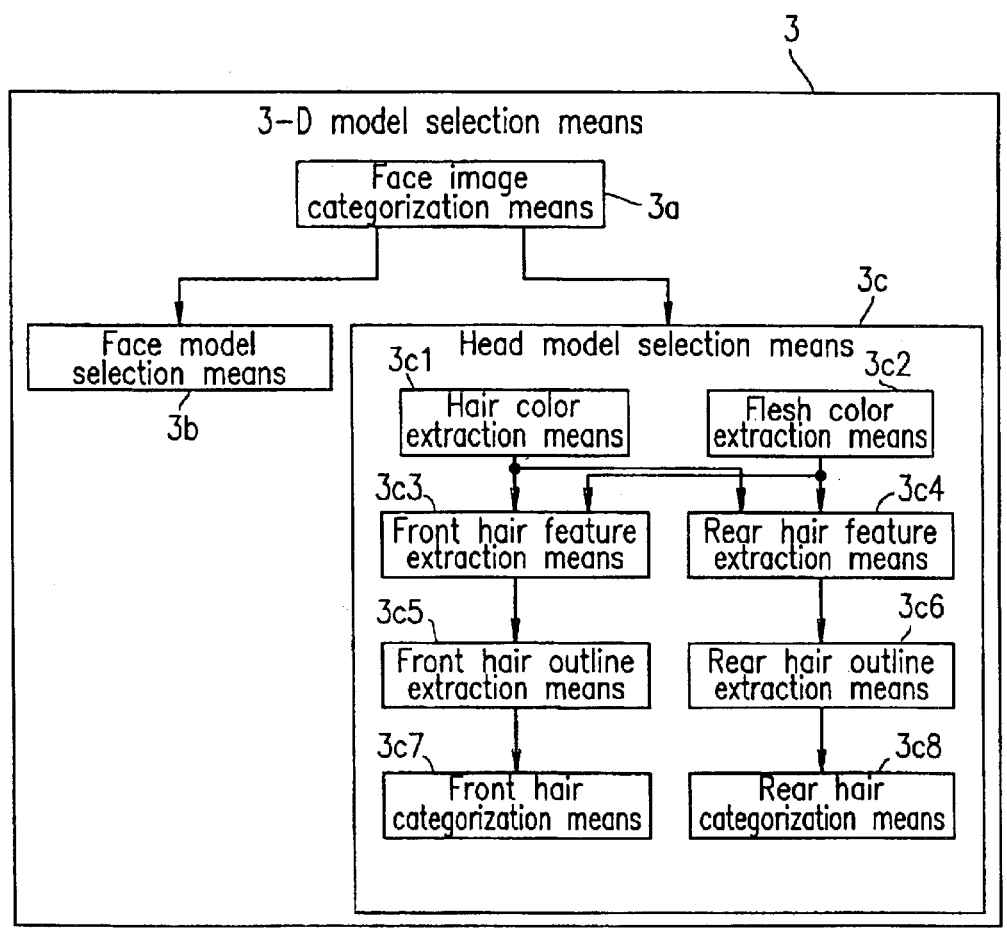
FIG. 4 is a block diagram showing a 3-D model selection means according to Example 2 of the present invention.

FIG. 4 shows a 3-D model selection means 3 according to Example 2 of the present invention.

Specifically, the 3-D model selection means 3 includes a face image categorization means 3*a* for categorizing a face image input from the face image input means 1 (FIG. 1); a face model selection means 3*b* for automatically selecting a 3-D model of a face part based on a result of the categorization by the face image categorization means 3*a*; a head model selection means 3*c* for automatically selecting a 3-D model of a head part based on a result of the categorization by the face image categorization means 3*a*. The head model selection means 3*c* includes a hair color extraction means 3*c*1; a flesh color extraction means 3*a*2; a front hair feature extraction means 3*c*3; a rear hair feature extraction means 3*c*4: a front hear outline extraction means 3*c*5; a rear hair outline extraction means 3*a*6; a front hair categorization means 3*c*7; and a rear hair categorization means 3*c*8.

Here, using the face image categorization means 3*a* and the face model selection means 3*b*, a face image is categorized and a 3-D model is determined for a part corresponding to the categorized face image. Hereinafter, the face image categorization and the automatic selection of a 3-D model of a face based on the categorization result will be described with reference to a flowchart shown in FIG. 5.

Figure 6:
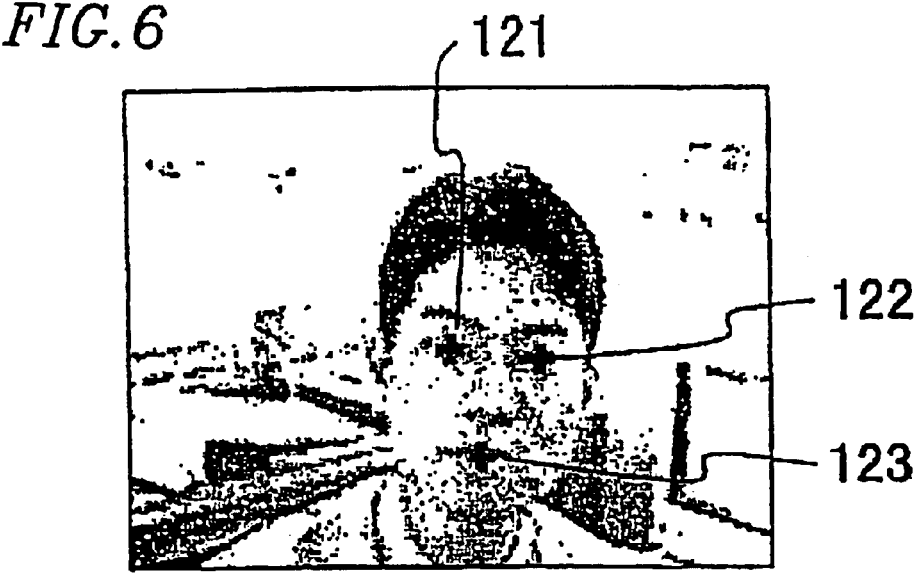
FIG. 6 is a diagram for explaining an example of position designation.

Initially, the operator designates positions of feature points of a face (eyes, mouth, etc.) in the original image. The center position of the face is then determined (step S21). The operator may also directly designate the center position of the face. Alternatively, as shown in FIG. 6, the operator may designate the coordinates of the centers (indicated by reference numerals 121, 122, and 123) of a right eye, a left eye, and a mouth, for example. The center located between these points is calculated and may be regarded as the center position of the face.

Figure 7:
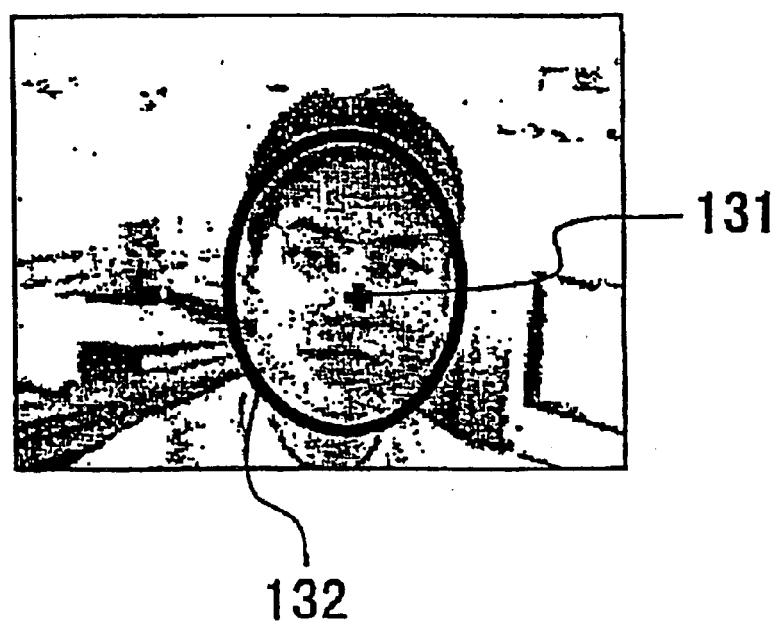
FIG. 7 is a diagram for explaining the coordinate of the center of an input image and a position of an initial outline.

After the center position of the face is determined in this way, an initial outline is placed in the vicinity of the outline of the face (an initial position) (step S22). The initial outline is, for example, a closed loop surrounding the eyes and mouth. Specifically, the relative distances between the eyes and mouth is statistically investigated in advance. An ellipse outline is created and positioned in such a manner to surround the eyes and mouth. FIG. 7 shows an image in which a center position 131 and an initial outline 132 have been determined.

Next, color differences between adjacent pixels on a line passing from the coordinate of the face through each coordinate on the initial outline are calculated based on the original image, the center position 131 and the initial outline 132. A color difference map image having the calculated color differences as pixel values is created (step S23). The coordinate of a pixel of the color difference map image corresponds to the coordinate of a middle point between adjacent pixels on a line passing from the coordinate of the center of the face through a coordinate on the initial outline.

The color difference is calculated, for example, in the following way. A subtraction is performed between the brightness of each pixel of image data for each monochromatic light to calculate a difference value. The sum of the difference values for all of the monochromatic light is calculated as the color difference. Alternatively, the pixel data is converted into HSV values which are represented by hue (H), saturation (S), and brightness (V). The positions of two pixels whose color difference is to be calculated are determined in an HSV space. The value of the distance between the two pixels in the HSV space may be defined as the color difference. Instead of adjacent pixels, a plurality of consecutive pixels may be regarded as a unit. An average color may be calculated for each unit and a color difference may be calculated between each average color.

Upon calculation of the color difference, detection precision of the color difference may be changed by utilizing the fact that the target is a human face. For example, when the pixel values of two pixels whose color difference is to be calculated are close to a pixel value representing flesh color, it is considered that the two pixels are highly likely to be inside the face outline. Therefore, the detection precision of the color difference may be reduced so that any influence, such as noise, can be reduced. The possibility that a jaw and J a neck both have pixel values representing flesh color is high. Therefore, when trying to detect a border between the jaw and the neck, the detection precision may be increased. Accordingly, when the color difference detection is performed on a line from the center position 131 toward the neck, the detection precision of the color difference is increased so as to make it easier to detect the border between the jaw and the neck. If the coordinate of the mouth is already known, a direction to the neck position can be estimated based on the coordinate of the mouth.

Figure 8:
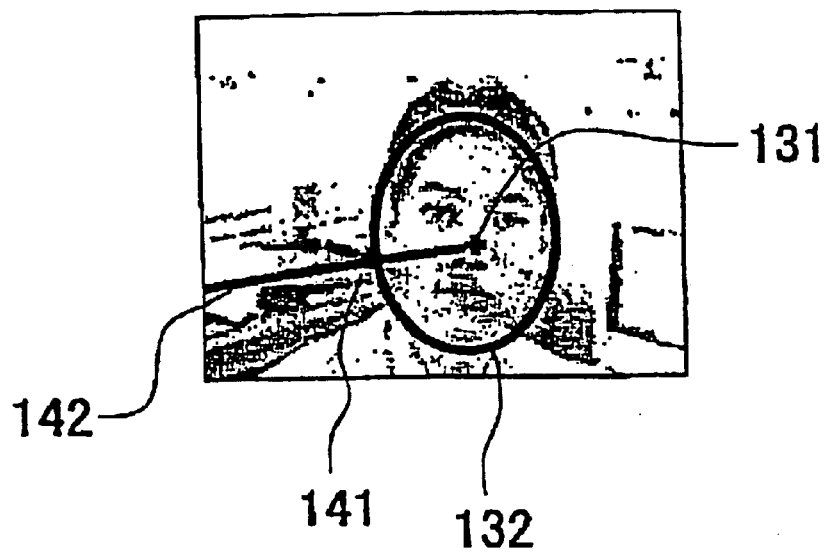
FIG. 8 is a diagram for explaining a technique for calculating color differences on a line passing from a point on the initial outline through the coordinate of the center shown in FIG. 7.
Figure 9:
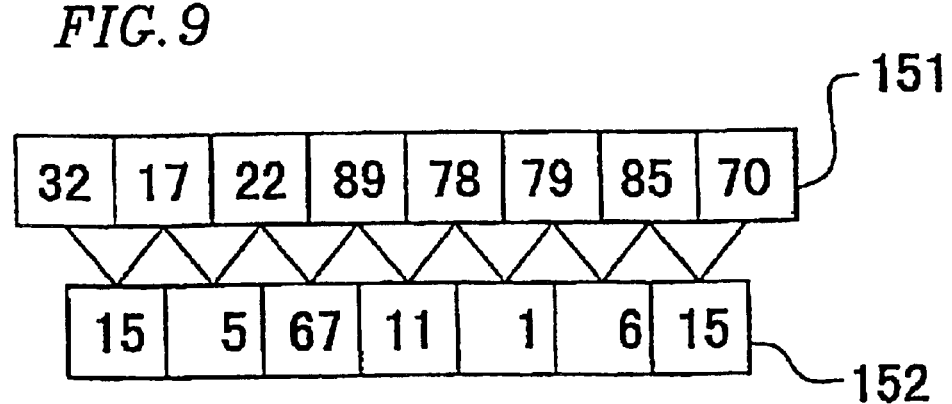
FIG. 9 is a diagram for explaining the color difference calculation technique shown in FIG. 8.

In FIG. 8, for example, it is considered that color differences are calculated on a line 142 passing from the center of the face 131 through a coordinate point 141 on the initial outline 132. FIG. 9 is a schematic diagram showing an array 151 of pixels on the line 142 (FIG. 8) and an array 152 of difference values between adjacent pixels of the array 151. That is, the array 152 indicates an array of color differences.

Figure 10A:
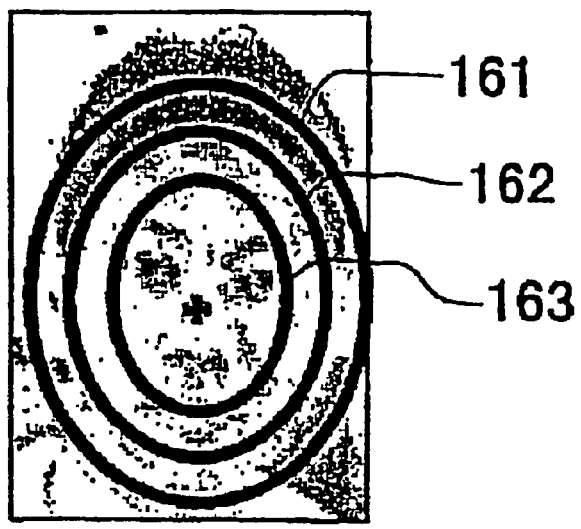
FIGS. 10A and 10B are diagrams for explaining a color difference calculation technique specializing in face outline geometry where a face is assumed to be in the form of an ellipse.
Figure 10B:
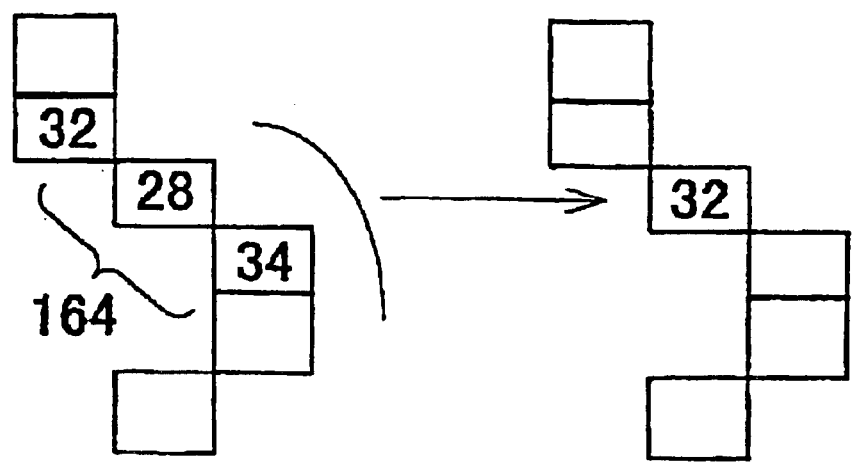

Further, a color difference map image may specialize in face outline geometry by utilizing features inherent to a human face outline after the above-described detection of the color differences has been made. For example, it is assumed that a face is similar to an ellipse. As shown in FIGS. 10A and 10B, on ellipse curves 161 through 163 which have arbitrary sizes and whose centers are the center 131 of the face, the color differences of one point and two adjacent points (indicated by reference numeral 164 in FIG. 10B) may be averaged. The resulting average value may be again stored as the color difference of the one point, thereby suppressing an influence of noise. In FIG. 10B, the color differences of the three points are 32, 28, and 34, respectively. In this case, the average is 32 [(32+28+34)/3= 31.33 . . . (rounding up the fractions)].

As described above, the fact that a target object is a human face is used as a constraint condition. Therefore, a more stable color difference map image specializing in detection of features of the shape of a jaw can be generated from an input image having an unclear outline or containing a high level of noise.

Figure 5:
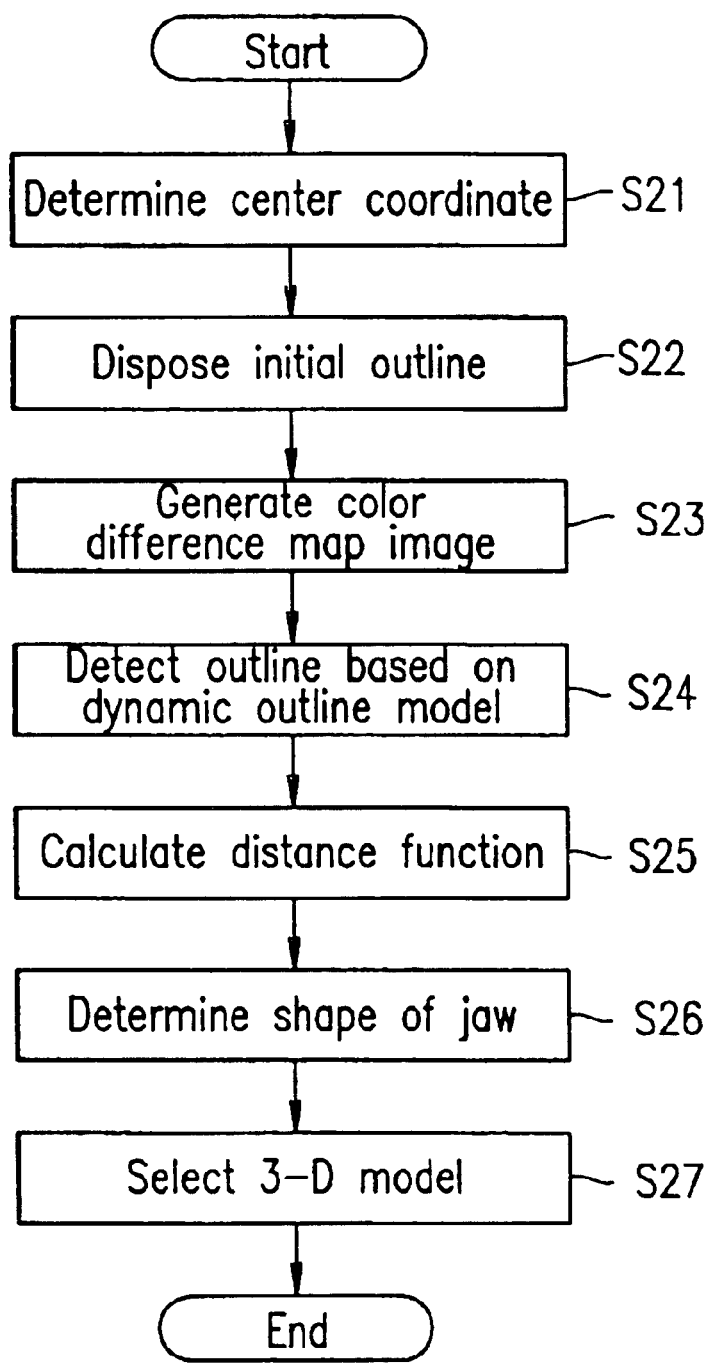
FIG. 5 is a flowchart showing a selection operation of a 3-D model of a face.

Next, with the color difference map image thus generated, an outline is extracted (detected) by moving the initial outline in accordance with a dynamic outline model (step S24 in FIG. 5).

An energy function E is now defined as the sum of internal energy E1 which represents the smoothness of an outline, energy E2 which causes the outline to shrink, and image energy E3 which characterizes the outline (E=E1+ E2+E3). The initial outline is moved in an attempt to find a minimum value of E. A Snake method is herein used as a technique for performing outline extraction using a dynamic outline model. The Snake method is disclosed in Publication 2 (Masahide KANEKO et al., "Encoding of Face Moving Picture Based on Detection of Change in Geometry and Geometric 3-D Model", IE87-101).

The color difference map image generated in step S23 is used to calculate the image energy E3. Specifically, the image energy E3(P) of an arbitrary point P(x, y) on the image is calculated using expression (1):

$$E3(P) = \alpha \times (MAX(D) - D(P)) \quad (1)$$

where D(P) is the color difference value in the color difference map image corresponding to P; MAX(D) is the maximum value of the color difference in the color difference map image; and coefficient $\alpha$ is the degree of image energy in the energy function E.

In accordance with expression (1), the smaller the color difference at a point, the greater the image energy of the point. Therefore, the outline tendsto move from a point having a small color difference toward a direction of minimum energy. Conversely, the greater the color difference at a point, the smaller the image energy of the point. Therefore, the outline resists movement from a point having a great color difference. Specifically, a border of a color region, such as a border between a face region and a background region, has a small image energy, where the outline is likely to converge at such a border.

As described above, when the color difference map image obtained in step S23 of FIG. 5 is used as an image energy, an energy image including a feature of the shape of a jaw can be created. Therefore, a jaw can stably be detected even from an input image whose outline is unclear or from an image containing a high level of noise.

Figure 11:
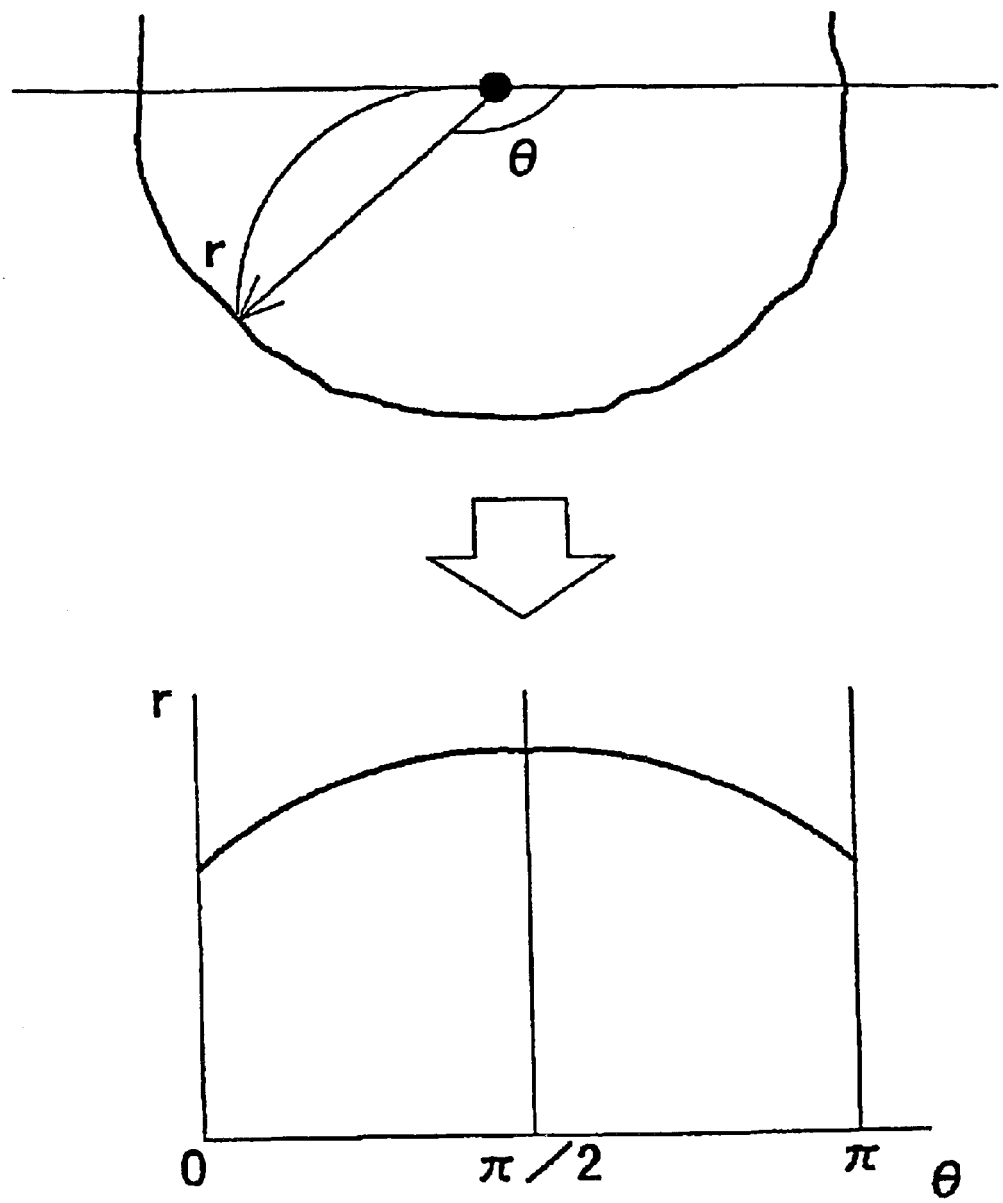
FIG. 11 is a diagram for explaining a technique for calculating a distance function from an extracted outline of a face.

Next, a distance function is calculated based on the outline thus obtained (step S25). Specifically, the outline is represented, for example, by a function $r=L(\theta)$ where r is the distance from a known coordinate existing inside a face, such as the center coordinate of the face; and $\theta$ is the direction (angle) as schematically illustrated in FIG. 11.

$r(=L(\theta))$ is calculated by changing the value of $\theta$ in a unit angle basis. For example, the unit angle is narrowed in a range having a characteristic shape of a jaw (in a direction toward a neck from the center of a face), so that the information amount is larger than that in the other directions. Alternatively, a distance function may be represented by a Fourier descriptor given by:

$$L(\theta) = \sum_n [A(n) \times \exp(j(2\pi n(s/L)))] \quad (2)$$

where A(n) is a coefficient representing a curve geometry; exp( ) is the power of the base of the natural logarithm; s is the distance on the curve; and L is the total length of the closed curve. Details of the Fourier descriptor are disclosed in Publication 3 (Supervising editors, Mikio TAKAGI and Yosuke SHIMODA, "Handbook of Image Analysisw", Tokyo University Shuppankai, 1991).

Next, the shape of a jaw is determined by comparing the thus-obtained feature of the distance function with a reference distance function (step S26 in FIG. 5). Herein, the reference distance function is a distance function which is determined from the outline of a reference jaw in advance. The outline of the reference jaw is obtained, for example, in the following way. Images whose outlines are manually detected in advance are categorized into groups having similar jaw shapes, such as a base-shaped type, a circle-shaped type, or the like. Outlines in each category are averaged. The resulting average outlines are used as reference outlines.

As for comparison of a distance function with a reference function, positions of inflection points of a distance function, the number of inflection points, the gradient between the inflection points, and the like are features of the distance function. Such features are compared between a distance function and a reference function. Before performing the comparison, a reference function needs to be normalized to match the position of a distance function.

The positions or number of inflection points, or the gradients between the inflection points are calculated for reference geometry in advance, and such information is stored in a memory. This information is compared with information on the inflection points of the distance function obtained in step S25 as required. As a result of the comparison, the shape of a jaw is determined based on the distance function closest to the reference distance function.

Figure 12:
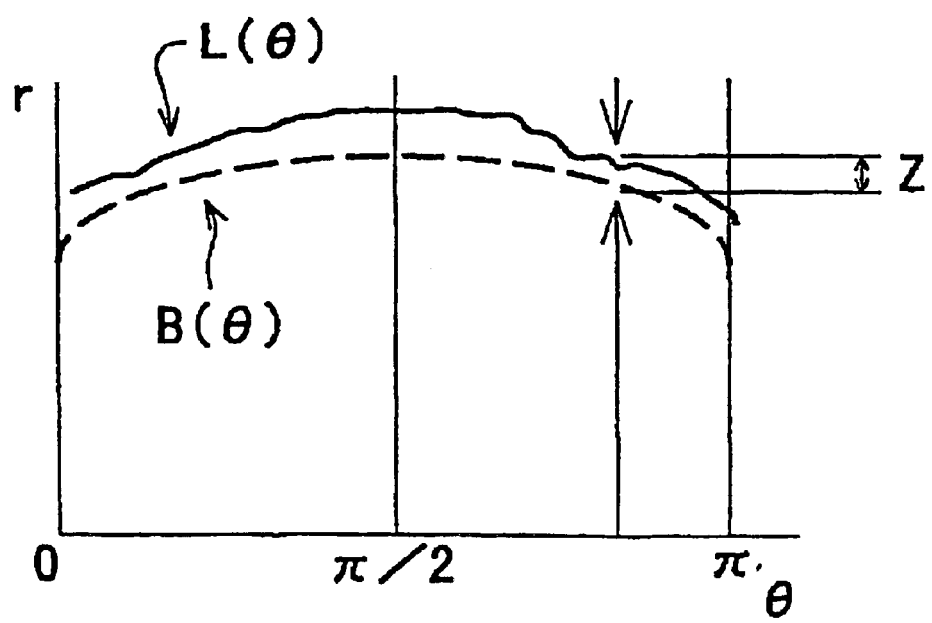
FIG. 12 is a diagram for explaining a technique for comparing a distance function obtained from an input image with a reference distance function.

Comparison of a distance function with a reference distance function may be performed by simply calculating the sums of differences between the distance function and the reference distance function. FIG. 12 schematically shows this situation. In FIG. 12, reference numeral Z indicates a distance between a distance function and a reference distance function. When the reference distance function is represented by B(θ), the sum Z1 of differences is given by:

$$Z1 = \sum_\theta |B(\theta) - L(\theta)|. \quad (3)$$

In this case, geometry having B(θ) which attains the minimum Z1 may be defined as the optimum geometry. In this technique, although values of B(θ) in the range of θ need to be determined for each reference geometry in a memory, geometry can be categorized in more detail and the determination is easily performed.

When a distance function is represented by a function which describes a curve on a plane as a frequency region, such as a Fourier descriptor, the distance function can be characterized by the calculated Fourier coefficients. Similar to the foregoing, the geometry of an outline can be determined by comparing the Fourier coefficients of the outline with those calculated for distance functions of the geometry of reference outlines.

A reference function is represented by the Fourier descriptor, and the resulting Fourier coefficients are indicated by Ab(n). The difference Z2 with the Fourier coefficients of a target distance function is calculated by expression (4) below:

$$Z2 = \sum_n |Ab(n) - A(n)|, \quad (4)$$

and the geometry having Ab(n) which attains the minimum of Z2 is determined as the optimum geometry.

In general, the Fourier coefficients of lower order terms reflect a rough geometry of a curve while the Fourier coefficients of higher order terms reflect a detailed geometry of the curve. Therefore, if the range of n which is used in the above-described calculation is narrowed, i.e., lower order terms are used in expression (4), to calculate Z2, the optimum result can be obtained by removing noise, differences among individual people, or the like, as much as possible. Thereafter, a 3-D model of a face is selected based on the shape of a jaw (step S27).

Specifically, structure information (categorization information) of 3-D models having various shapes of jaws created by professional designers or the like may be stored in the memory in advance. 3-D face model structure information corresponding to the shape of a jaw determined may be retrieved from the memory and the 3-D face model is thus reproduced. FIG. 13 shows an example of categorization of a face stored in the memory. The categories include a standard type, a thin type, a broad type, a circle-shaped type, and the like.

In this way, the shape of a jaw is stably detected and determined from 2-D information such as a photographic image. Based on the resulting shape, a 3-D model of a face can be generated.

Next, the face image is categorized using the face image categorization means 3a and the head model selection means 3c (FIG. 4). A 3-D model is determined for a part categorized as a head. Hereinafter, the face image categorization and the automatic selection of a 3-D model of a head based on the categorization result will be described with reference to the flowchart shown in FIG. 14.

Initially, a face image is input via the face image input means 1 (step S41). Next, rough positions of a right eye, a left eye and a mouth, and an outline of the face are input (step S42).

Next, the hair color extraction means 3c1 (FIG. 4) extracts the hair color in a manner described below (step S43). The hair color extraction will be described with reference to FIG. 15. As indicated in FIG. 15, in the following explanation, as the y coordinate is moved downward, the value of the y coordinate increases.

A flesh color is extracted based on the pixel values in a region in the vicinity of the nose by the flesh skin extraction means 3c2 (FIG. 4). The region in the vicinity of the nose is obtained based on the coordinates of the right eye, the left eye, and the mouth. An average of the pixel values may be calculated. Alternatively, the average and the variance of the pixel values may be calculated. Thereafter, the average and variance may be calculated again after removing pixels which depart greatly from the previous average. The extraction of a flesh color is useful for extraction of a hair color and a hair feature as described below, but is not necessarily required. The flesh extraction means 3c2 may therefore be omitted.

Figure 15:
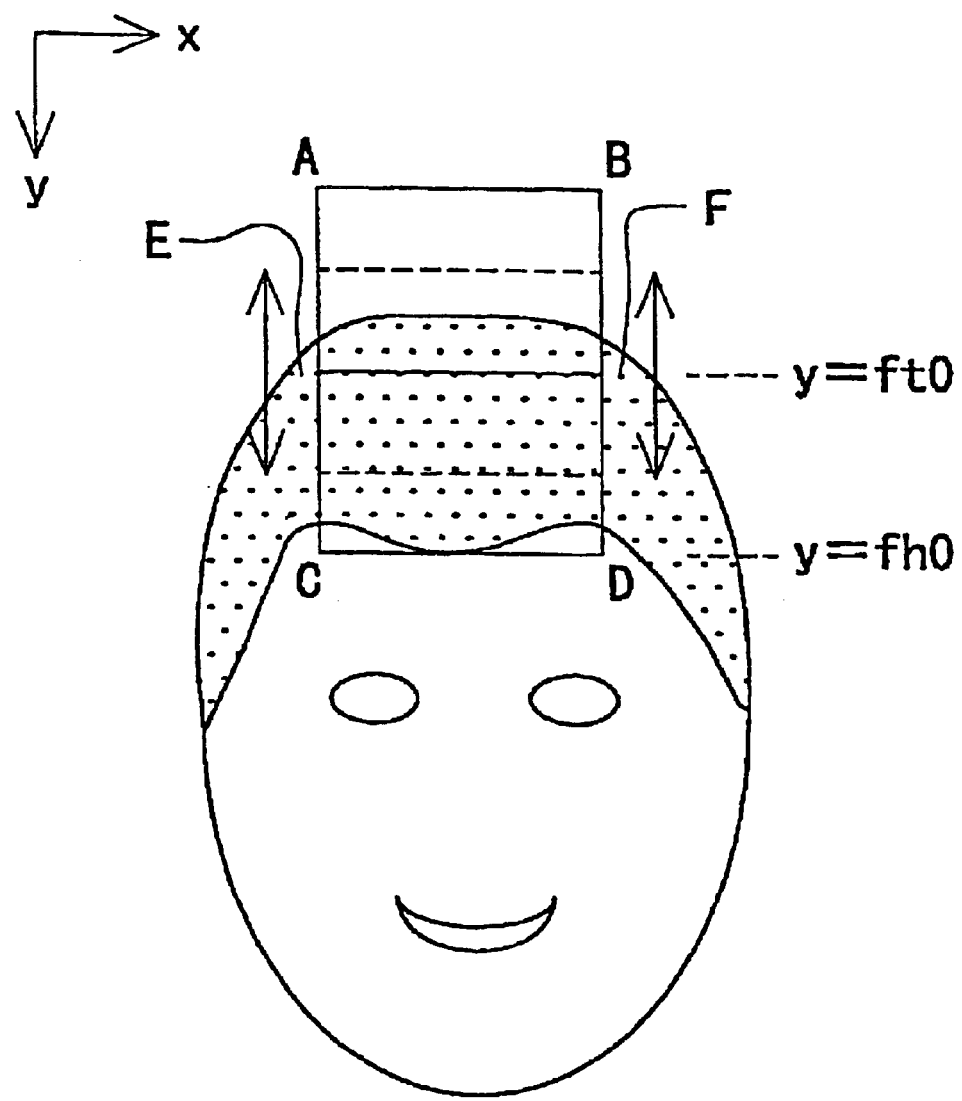
FIG. 15 is a diagram for explaining extraction of a hair color.
Figure 16A:
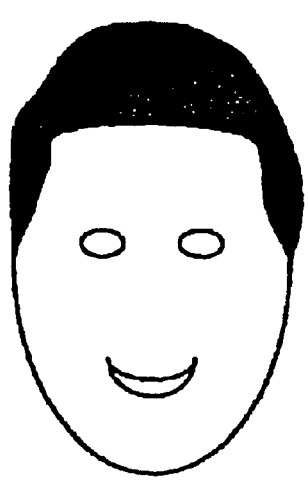
FIGS. 16A through 16D are diagrams for explaining categorization of a front hair.
Figure 16B:
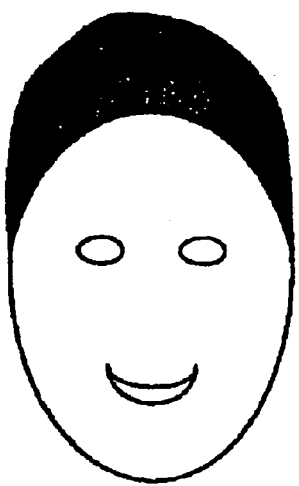
Figure 16C:
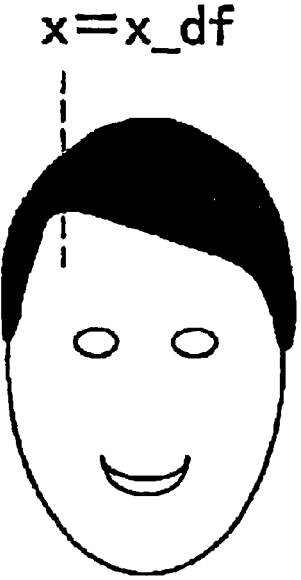
Figure 16D:
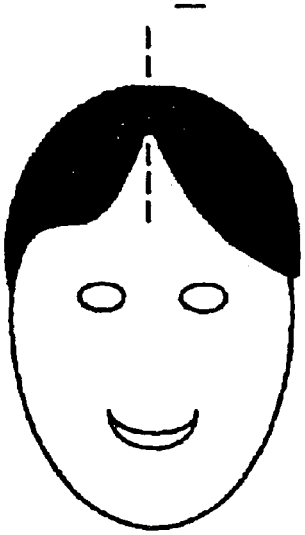

Thereafter, as shown in FIG. 15, initial estimated values ft0 and fh0 of a height ft of the top of a head and a height fh of a hairline, respectively, are determined based on the coordinates of the right eye, the left eye, and the mouth by, for example:

$ft0 = y\_eye - k\_ft \times (y\_mouth - y\_eye)$; and $fh0 = y\_eye - k\_fh \times (y\_mouth - y\_eye)$, where y_eye indicates the average y coordinate of the right eye and the left eye; y_mouth indicates the y coordinate of the mouth; and k_ft and k_fh indicate appropriately predetermined coefficients.

Next, based on the above-described ft0 and fh0 values, sampling rectangles ABFE and BFDC are created. Herein, the y coordinates of B and F are equal to ft0; the y coordinates of C and D are equal to fh0: and the y coordinates of A and B are equal to ft0−(fh0−ft0) (i.e., AE=EC). Further, the x coordinates of A, E and C are present in the vicinity of the right eye (the left side on the image) or slightly left (on the image) from the right eye. The x coordinates of B, F, and D are present in the vicinity of the left eye (the right side of the image) or slightly right (on the image) from the left eye.

Thereafter, the height ft of EF is varied upward or downward in the following range:

$ft0 - ft\_up \leq ft \leq ft0 + ft\_down$ where ft_up and ft_down are appropriate thresholds for upward and downward variations, respectively, in order to search and estimate a height ft0 at which pixel values in the rectangle ABFE are separated at a maximum from pixel values in the rectangle EFDC. The degree of the separation is given by:

$$\{S1 \times (A1-A3) \times (A1-A3) + S2 \times (A2-A3) \times (A2-A3)\}/V3 \quad (5)$$

where A1 and V1 are the average and the variance of the pixel values in the rectangle ABFE, respectively: A2 and V2 are the average and the variance of the pixel values in the rectangle EFDC, respectively; A3 and V3 are the average and the variance of pixel values in the rectangle ABDC, respectively: and S1:S2 is a ratio of the area of the rectangle ABFE to the area of the rectangle EFDC. When the image is a color image, the pixel values are calculated as 3-D vectors.

Next, a background color is extracted from the rectangle ABFE. In this case, the bottom side EF is positioned at a height ft obtained after the above-described search. The average and the variance of the pixel values may be calculated. Thereafter, the average and variance may be calculated again after removing pixels which depart greatly from the previous average. The extraction of a background color is useful for extraction of a hair color as described below, but is not necessarily required.

Next, a background color is extracted from the rectangle EFDC. In this case, the top side EF is positioned at a height ft obtained after the above-described search. The average may be calculated. In such a calculation, pixel values in a region other than the hair may be adversely included, resulting in a reduction in the precision.

To avoid this, for example, pixels close to a flesh color or a background color are determined based on the above-described average and variance of the flesh color or background color, and the average and variance of a hair color are calculated after removing such pixels. Further, based on the average and variance of the hair color, the average and variance of the hair color are again calculated after removing pixels which greatly depart from the previous average (also removing the pixels close to the flesh or background color). In this case, when the number of removed pixels is large and the number of pixels used in the calculation of the hair color (hereinafter referred to as "hair pixels") is smaller than a given threshold n_sh, the hair is thin, so that the extraction of the hair color is likely to be unstable. The hair feature extraction in step S45 (FIG. 14) is skipped and the process is transferred to the categorization of the hair of step S46 (step S44). In this case, the front and rear hair categorization means 3c7 and 3c8 (FIG. 4) determine "the hair is thin-."When one (or both) of the flesh and background color extraction is not performed, the operation of the removal of pixels close to the flesh or background color which are not extracted is omitted. The extraction of a hair color can still be performed, but the precision of the extraction may be reduced.

Next, a hair feature is extracted using one or both of the front and rear hair feature extraction means 3c3 and 3c4 (step S45).

An operation example of the front hair feature extraction means 3a1 in step S45 will be described below.

Using the averages and variances of the above-described hair and flesh colors, each pixel in the image is labeled as a non-hair pixel when the pixel is closer to a flesh color than to a hair color and when the pixel does not greatly depart from the average flesh color, or as a hair pixel otherwise. Thereby, a hair region can be extracted. Note that when a flesh color is not extracted in step S43, each pixel in the image is labeled as a hair pixel when the pixel does not greatly depart from the average hair color, or as a non-hair pixel otherwise. The above-described hair region, as it is, is considered as a feature of the front hair. An 11×7 (widthwise×lengthwise) mesh is provided at an approximate position to include the front hair. The number of hair pixels in each hole of the mesh is regarded as a feature of the front hair (hereinafter referred to as a "front hair mesh features").

An operation example of the rear hair feature extraction means 3c4 in step S45 will be described below.

Using the averages and variances of the above-described hair and flesh colors, each pixel in the image is labeled as a non-hair pixel when the pixel is closer to a hair color than to a flesh color and when the pixel does not greatly depart from the average hair color, or as a non-hair pixel otherwise. Thereby, a hair region can be extracted. Note that when a flesh color feature is not extracted in step S43, each pixel in the image is labeled as a hair pixel when the pixel does not greatly depart from the average hair color, or as a non-hair pixel otherwise. The above-described hair region, as it is, is considered as a feature of the rear hair. Additional rectangular regions are provided on the right and left sides of a face, which are likely to have a substantial amount of hair in the case of long hair including so-called "semi-long" hair and which are likely to not have much hair in the case of short hair. A rear hair feature, such as the number of hair pixels in these rectangles (hereinafter referred to as a "rear hair rectangle feature"), is thus extracted.

In the above description, the front hair feature and the rear hair feature are considered to be separated from each other, and the different extraction procedures are applied to the front hair feature and the rear hair feature separately. Alternatively, both features may not be distinguished. For example, regardless of whether a hair pixel region is the front hair or the rear hair, each pixel in the image is labeled as a hair pixel when the pixel does not greatly depart from the average hair color value, or as a non-hair pixel otherwise.

The front hair outline extraction means 3c5 operates using the hair region extracted by the front hair feature extraction means 3a3 in the following way.

The image is scannedfrom the middlepointbetween the right and left eyes toward directly above and up to an edge of the image. By such scanning, the longest run of the hair pixels is detected. An outline is searched in the left direction (on the image), starting from the lowest point of the run. The search comes to a point which is lower than a threshold of the y coordinate (higher in the y coordinate value) defined based on the coordinates of the right and left eyes and which is further left than a threshold of the x coordinate, which is similarly defined. Then, the search is stopped. Next, an outline is searched in the right direction (on the image), starting from the lowest point of the run. The search comes to a point which is lower than a threshold of the y coordinate (higher in the y coordinate value) defined based on the coordinates of the right and left eyes and which is further right than a threshold of the x coordinate, which is similarly defined. Then, the search is stopped. The outline on the left side and the outline on the right side are linked to each other, resulting in a front hair outline.

The rear hair outline extraction means 3c6 is operated using the hair region extracted by the rear hair feature extraction means 3c4 in the following way.

The image is scanned from the middle point between the right and left eyes toward directly above and up to an edge of the image. By such scanning, the longest run of the hair pixels is detected. An outline is searched in the left direction (on the image), starting from the lowest point of the run. The search comes to a point which is lower than a threshold of the y coordinate (higher in the y coordinate value) defined based on the coordinates of the right and left eyes and which is further left than a threshold of the x coordinate, which is similarly defined. Then, the search is stopped. Next, an outline is searched in the right direction (on the image), starting from the lowest point of the run. The search comes to a point which is lower than a threshold of the y coordinate (higher in the y coordinate value) defined based on the coordinates of the right and left eyes and which is further right than a threshold of the x coordinate, which is similarly defined. Then, the search is stopped. The outline on the left side and the outline on the right side are linked to each other, resulting in a rear hair outline.

In the above description, the front hair feature and the rear hair feature are considered to be separated from each other, and the different extraction procedures are applied to the front hair feature and the rear hair feature separately. Alternatively, both features may not be distinguished, and are considered to be included in a single type of a hair region. An outline of hair may be searched for and extracted from such a region.

The front and rear feature extraction means 3c3 and 3c4 may extract other hair features using the hair outline extracted above. For example, the highest point of the front hair outline may be detected and may be defined as a front hair feature, or a point of the rear hair outline may be detected at which a concave toward the inside of the outline is the largest, and may be defined as a rear hair feature.

Figure 14:
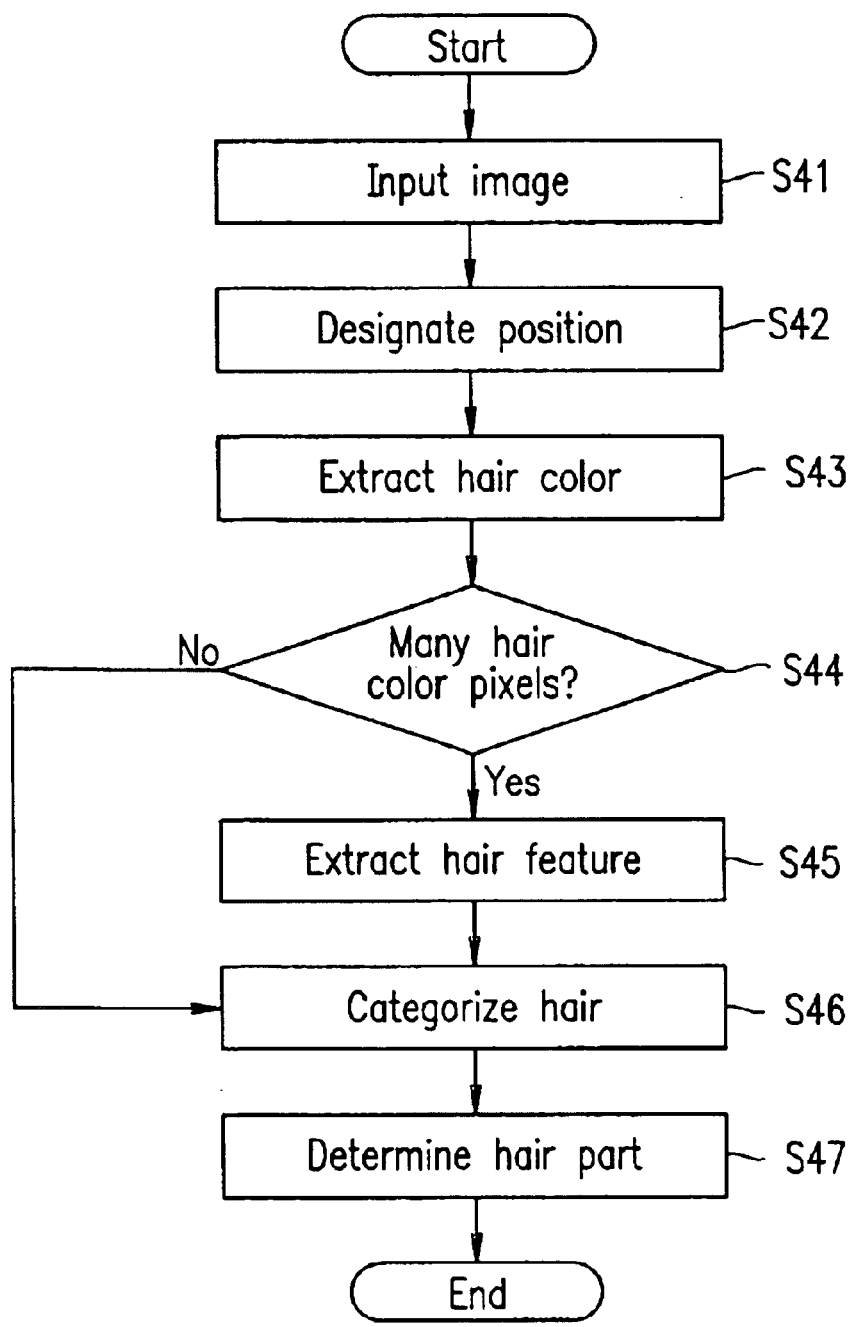
FIG. 14 is a flowchart showing selection operation of a 3-D model of a head.

The front and rear hair categorization means 3c7 and 3c8 categorize a hair shape based on the hair features obtained by the respective front and rear hair feature extraction means 3c3 and 3c4 and the hair outlines obtained by the front and rear outline extraction means 3c5 and 3c6 (step S46 in FIG. 14). Alternatively, front and rear hair may not be distinguished, and may be considered to be included in a single type of hair. Therefore, the hair may be categorized.

Next, an operation example of the front hair categorization means 3a7 will be described below.

The front hair is categorized as "okappa" based on the front mesh features extracted as above when the number of holes of the mesh having the number of hair pixels greater than or equal to a given threshold c2 is greater than or equal to a given threshold m_fc. Herein, the term "okappa" is defined as a hairstyle in which most of a forehead is covered with hair. The front hair is categorized as "sudare" when the number of hair pixels is less than c2 and the number of holes of the mesh is greater than or equal to another threshold c1 (c1<c2). Herein, the term "sudare" is defined as a hairstyle in which a forehead is covered with a substantial amount of hair while a substantial amount of flesh can also be seen through the hair.

Using the above-described feature of the hair outline, a hairstyle is categorized, for example, in the following way (see FIGS. 16A through 16D).

When the front hair is not categorized as "okappa" or "sudare", by how much the outline of a hair region caves in (upward) at a top portion of the outline is examined. The front hair is roughly categorized as "with no partition" when there is substantially no concave, and is otherwise roughly categorized as "with partition".

When the front hair is categorized as "with no partition", the linearity of the top portion of the front hair outline is examined. The front hair is further categorized as a "square-shaped type" (see FIG. 16A) when the linearity is great (nearly straight), and is otherwise categorized as a "circle-shaped type" (see FIG. 16B).

When the front hair is categorized as "with partition", the x coordinate (hereinafter referred to as "x_df") of the uppermost point of the front hair outline detected as above is examined. Herein, thresholds df1, df2, df3, and df4 are predetermined where df1<df2<df3<df4. When x_df<df1, the front hair is categorized as a "1-to-9 partition" (see FIG. 16C). The term "1-to-9 partition" is defined as a hairstyle in which the hair is parted at a side of the head, the proportion of the hair on the right to the hair on the left is about 1:9. When df1≦x_df<df2, the front hair is categorized as a "3-to-7 partition" (see FIG. 16C). The term "3-to-7 partition" is defined as a hairstyle in which the hair is parted at a side of the head, the proportion of the hair on the right to the hair on the left is about 3:7. When df2≦x_df≦df3, the front hair is categorized as a "center partition" (see FIG. 16D). The term "center partition" is defined as a hairstyle in which hair is parted at a center of the head. When df3<x_df≦df4, the front hair is categorized as the "7-to-3 partition" as described above. When df4<x_df, the front hair is categorized as "9-to-1 partition". The term "9-to-1 partition" is defined as a hairstyle in which the hair is parted at a side of the head, the proportion of the hair on the right to the hair on the left is about 9:1.

Next, an operation example of the rear hair categorization means 3c8 will be described below.

The rear hair is categorized as "long hair" based on the rear hair rectangle feature extracted as above when the number of hair pixels is greater than or equal to a predetermined threshold n_b, and is otherwise categorized as "short hair".

Figures 17A, 17B:
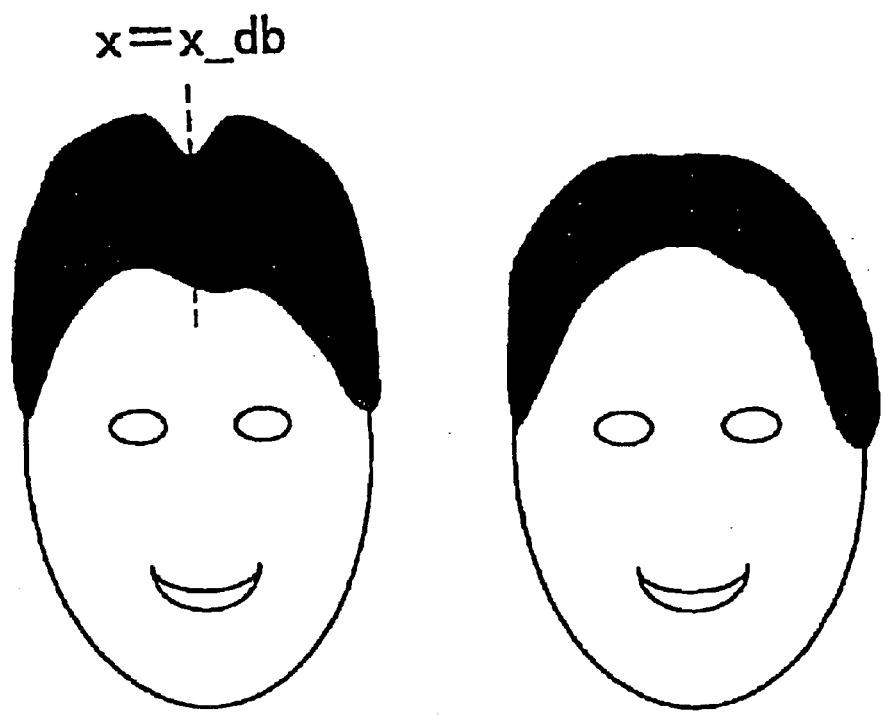
FIGS. 17A and 17B are diagrams for explaining categorization of a rear hair.

Using such hair outline features, for example, hairstyles are categorized in the following way (see FIGS. 17A and 17B).

The "long hair" and "short hair" categorizations are the major categorization. The x coordinate (hereinafter referred to as x_db) of a point at which the rear hair detected as above caves in at a maximum inwardly to the inside of the hair region is examined. Herein, thresholds db1, db2, db3, and db4 are predetermined where db1<db2<db3<db4. When x_db<db1, the rear hair is sub-categorized as a "1-to-9 partition". When db1≦x_db<db2, the rear hair is sub-categorized as a "3-to-7 partition". When db2≦x_d≦db3, the rear hair is sub-categorized as a "center partition" (see FIG. 17A). When db3<x_db≦db4, the front hair is sub-categorized as a "7-to-3 partition". When db4<x_db, the rear hair is sub-categorized as a "9-to-1 partition". When the concave at the point at which the rear hair detected as above caves in at a maximum toward the inside of the hair region is not very great, the rear hair is sub-categorized as "with no partition" (see FIG. 17B).

In this way, a more realistic geometry of a head can be detected from two-dimensional information such as a photograph. A 3-D model of a head in accordance with the detected geometry can automatically be selected.

The 3-D model generation devices of Examples 1 and 2 perform 3-D model generation by using a 3-D model generation program stored in the memory (not shown). The program may be stored in a computer-readable recording medium. In the present invention, although this recording medium is not shown, the 3-D model generation device includes a program read device. The recording medium may be a program medium which can be inserted into and read by the program read device. Alternatively, as in the Examples, the program may be stored in a memory means such as a program memory included in the device. In either case, the stored program may be directly accessed and executed. Alternatively, the program may be read out and downloaded into a main memory (not shown) where the program is in turn executed. In this case, a program for downloading is stored in the device in advance.

Herein the above-described program medium is a recording medium which is separated from the 3-D model generation device. The program medium may be a tape such as a magnetic tape or a cassette tape, a magnetic disk such as a floppy disk or a hard disk, an optical disk such as a CD-ROM, an MO, an MD, or a DVD, a card such as an IC card or an optical card, a medium in which a program is stored in a fixed form, such as a mask ROM, an EPROM, an EEPROM, or a flash ROM (semiconductor memories), or the like.

When the 3-D model generation device of the present invention further includes a means for communicating with the outside of the device (wireless communication capability or wire communication capability via public lines such as the Internet), the program medium may store a program which is downloaded from the outside connected via such a means. A program for downloading may be stored in the device in advance or may be installed from another medium when a target program is downloaded via a communication network.

The image processing device and image processing method of the present invention and the recording medium storing the image processing program have the following advantageous effects.

When a 2-D face image is input and mapped to a 3-D model, a more realistic 3-D still image can be generated from the input 2-D image. Further, when the 3-D model includes information on a motion on a time series, a more realistic 3-D moving image can be generated based on the motion information. For example, when a 3-D model of a part corresponding to a face has information on a motion on a time series, facial expression can be changed based on the motion information.

Further, a 3-D model corresponding to a trunk is also provided. An operator can select the model via the input means. Therefore, a 3-D model of a whole body including not only a face and a head, but also a trunk can be customized in accordance with the operator's preference(s).

A 3-D model of a part other than a target part to be selected can be changed. Therefore, the operator's tasks can be reduced.

Further, when a 3-D model of one part and a 3-D model of another part corresponding to the one part are selected, the combination of the parts and the 3-D models is stored. At a successive time and thereafter, when a part and a 3-D model thereof, a combination of which is previously stored, is selected, a 3-D model of another part corresponding to that part is automatically selected based on the stored combination. Therefore, the operator's tasks can be reduced.

Further, a 3-D model of a part corresponding to a face or head is automatically selected. Therefore, the operator's tasks can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing device for generating a 3-D model image of a target object included in an input image, comprising:

a face image input means for inputting a face image;

a 3-D model input means for inputting one or a plurality of 3-D models for each of a plurality of parts;

a 3-D model selection means for selecting a 3-D model for an arbitrary part of the plurality of parts based on an instruction input by an operator;

a face image mapping means for mapping the face image input via the face image input means to the 3-D model selected by the 3-D model selection means and for displaying the mapped 3-D model; and an image generation means for generating a 3-D still image of the target object using the 3-D model selected by the 3-D model selection means and the face image input by the face image input means.

2. An image processing device according to claim 1, wherein the 3-D model has information on a motion on a time series of one or all of the plurality of parts; and the image generation means generates a 3-D moving image using the 3-D model selected by the 3-D model selection means and the face image input by the face image input means.

3. An image processing device according to claim 1, wherein the plurality of parts include a part corresponding to a trunk, a part corresponding to a face, and a part corresponding to a head.

4. An image processing device according to claim 1, wherein when the 3-D model selection means changes a 3-D model of a first part, the 3-D model selection means changes a 3-D model of a second part to a 3-D model of a second part that is in association with the changed 3-D model of the first part.

5. An image processing device according to claim 1, further comprising:

a face image categorization means for categorizing a face image input via the face image input means; and a face model selection means for automatically selecting a 3-D model of a part corresponding to a face responsive to a result of the categorization by the face image categorization means, wherein the face image mapping means maps the face image input via the face image input means to the 3-D model of the part corresponding to a face selected via the face model selection means.

6. An image processing device according to claim 5, further comprising a head model selection means for automatically selecting 3-D model of a head responsive to the result of the categorization by the face image categorization means.

7. An image processing device according to claim 1, further comprising:

a face image categorization means for categorizing a face image input via the face image input means; and a head model selection means for automatically selecting a 3-D model of a part corresponding to a head based on a result of the categorization by the face image categorization means, wherein the face image mapping means maps the face image input via the face image input means to the 3-D model of the part corresponding to a head selected via the head model selection means.

8. An image processing method for generating a 3-D model image of a target object included in an input image, comprising the steps of:

inputting a face image via a face image input means;

inputting one or a plurality of 3-D models for each of a plurality of parts via a 3-D model input means;

selecting a 3-D model for an arbitrary part of the plurality of parts based on an instruction input by an operator;

mapping the face image input to the selected 3-D model and displaying the mapped 3-D model on a display means; and generating a 3-D still or moving image of the target object using the selected 3-D model and the input face image.

9. An image processing method for generating a 3-D model image of a target object according to claim 8, wherein said selecting includes selecting a 3-D model of a first part and selecting a 3-D model for a second part and wherein said image processing method further comprises the step of:

changing the 3-D model of the first part that was previously selected and the 3-D model of the second that was first part previously selected;

wherein said changing includes changing the previously selected 3-D model of a first part to another 3-D model of the first part and changing the previously selected 3-D model of a second part to another 3-D model of the second part, where the another 3-D model of the second part is associated with the another 3-D model of the first part.

10. An image processing method for generating a 3-D model image of a target object included in an input image according to claim 8, wherein said selecting includes selecting a first 3-D model of a first part and selecting a second 3-D model for a second part and wherein said image processing method further comprises the steps of:
storing a combination of the first and second parts and the first and second 3-D models;
changing the first 3-D model that was previously selected to another first 3-D model of the first part, responsive to another instruction input by the operator; and
changing the second 3-D model that was first part previously selected to another second 3-D model that is associated with the another first 3-D model, responsive to the changing of the first 3-D model to the another first 3-D model.

11. An image processing method for generating a 3-D model image of a target object included in an input image according to claim 10, wherein said changing of the second 3-D model is accomplished automatically responsive to the changing of the first 3-D model to the another first 3-D model.

12. An image processing method for generating a 3-D model image of a target object included in an input image, comprising the steps of:
inputting a face image via a face image input means;
categorizing the input face image;
inputting one or a plurality of 3-D models for each of a plurality of parts via a 3-D model input means;
automatically selecting a 3-D model of an input arbitrary part based on a result of the categorization by the face image categorization step;
mapping the face image input to the automatically selected 3-D model and displaying the mapped 3-D model on a display means; and
generating a 3-D still or moving image using the automatically selected 3-D model and the input face image.

13. A computer-readable recording medium storing an image processing program for generating a 3-D model image of a target object included in an input image, the program comprising the steps of:
inputting a face image via a face image input means;
inputting one or a plurality of 3-D models for each of a plurality of parts via a 3-D model input means;
selecting a 3-D model for an arbitrary part of the plurality of parts based on an instruction input by an operator;
mapping the face image input to the selected 3-D model and displaying the mapped 3-D model on a display means; and
generating a 3-D still or moving image using the selected 3-D model and the input face image.

14. A computer-readable recording medium storing an image processing program for generating a 3-D model image of a target object included in an input image, the program comprising the steps of:
inputting a face image via a face image input means;
categorizing the input face image;
inputting one or a plurality of 3-D models for each of a plurality of parts via a 3-D model input means;
automatically selecting a 3-D model of an input arbitrary part based on a result of the categorization by the face image categorization step;
mapping the face image input to the automatically selected 3-D model and displaying the mapped 3-D model on a display means; and
generating a 3-D still or moving image using the automatically selected 3-D model and the input face image.

15. An image processing device for generating a 3-D model image of a target object included in an input image, comprising:
a face image input means for inputting a face image;
a 3-D model input means for inputting one or a plurality of 3-D models for each of a plurality of parts;
a 3-D model selection means for selecting a 3-D model for an arbitrary part of the plurality of parts based on an instruction input by an operator;
a face image mapping means for mapping the face image input via the face image input means to the 3-D model selected by the 3-D model selection means and for displaying the mapped 3-D model;
an image generation means for generating a 3-D still image of the target object using the 3-D model selected by the 3-D model selection means and the face image input by the face image input means;
wherein when the 3-D model selection means changes a 3-D model of a first part, the 3-D model selection means changes a 3-D model of a second part in association with the changing of the 3-D model of the first part; and
wherein when a first 3-D model of a first part and a second 3-D model of a second part corresponding to the first part are selected, the 3-D model selection means stores a combination of the first and second parts and the first and second 3-D models; and when an arbitrary 3-D model of the first part is changed to the first 3-D model, the 3-D model selection means changes a 3-D model of the second part to the second 3-D model.

16. An image processing device for generating a 3-D model image of a target object included in an input image, comprising:
a face image input means for inputting a face image;
a 3-D model input means for inputting one or a plurality of 3-D models for each of a plurality of parts;
a 3-D model selection means for selecting a 3-D model for an arbitrary part of the plurality of parts based on an instruction input by an operator;
a face image mapping means for mapping the face image input via the face image input means to the 3-D model selected by the 3-D model selection means and for displaying the mapped 3-D model;
an image generation means for generating a 3-D still image of the target object using the 3-D model selected by the 3-D model selection means and the face image input by the face image input means;
wherein when the 3-D model selection means changes a 3-D model of a first part, the 3-D model selection means changes a 3-D model of a second part in association with the changing of the 3-D model of the first part; and
wherein when a specific type first 3-D model of a first part is selected, a second 3-D model of a second part corresponding to a third 3-D model of the first part prior to the selection is stored by the 3-D model selection means; and when the specific type first 3-D model of the first part is changed to a 3-D model not being of the specific type of the first part, the 3-D model selection means changes a 3-D model of the second part to the stored second 3-D model.

* * * * *